US008440316B2

(12) United States Patent
Chomik et al.

(10) Patent No.: US 8,440,316 B2
(45) Date of Patent: May 14, 2013

(54) ODOR TRANSMISSION-RESISTANT POLYMERIC FILM

(75) Inventors: Richard S. Chomik, Middlesex, NJ (US); Rosemary Knuth, Congers, NY (US); Caryl Yeager, Madison, NJ (US); Mark Yoho, Chagrin Falls, OH (US)

(73) Assignee: Playtex Products, Inc., Shelton, CT (US)

( * ) Notice: Subject to any disclaimer, the term of this patent is extended or adjusted under 35 U.S.C. 154(b) by 447 days.

(21) Appl. No.: 11/455,398

(22) Filed: Jun. 19, 2006

(65) Prior Publication Data
US 2006/0249418 A1 Nov. 9, 2006

Related U.S. Application Data

(62) Division of application No. 10/418,895, filed on Apr. 17, 2003, now Pat. No. 7,100,767.

(60) Provisional application No. 60/373,143, filed on Apr. 17, 2002.

(51) Int. Cl.
B32B 27/08 (2006.01)

(52) U.S. Cl.
USPC .................. 428/474.4; 428/475.8; 428/476.3; 428/35.2; 428/35.4

(58) Field of Classification Search ............... 428/474.1, 428/480, 500, 35.2, 35.4, 474.4, 475.8, 476.3
See application file for complete search history.

(56) References Cited

U.S. PATENT DOCUMENTS

| | | | |
|---|---|---|---|
| 1,226,634 A | 5/1917 | Briese | |
| 1,239,427 A | 9/1917 | Bunnel et al. | |
| 1,265,148 A | 5/1918 | Warren | |
| 2,411,430 A | 11/1946 | Hodson | |
| 3,077,457 A | 2/1963 | Kulka | |
| 3,356,192 A | 12/1967 | Cameron | |
| 3,536,192 A | 10/1970 | Couper | |
| 3,579,416 A | 5/1971 | Schrenk | |
| 3,655,129 A | 4/1972 | Seiner | |
| 3,741,253 A | 6/1973 | Brax et al. | |
| 3,923,005 A | 12/1975 | Fry et al. | |
| 4,009,253 A | 2/1977 | Schleppnik et al. | |
| 4,101,711 A * | 7/1978 | Stillman ...................... | 428/35.2 |
| 4,187,251 A | 2/1980 | Schleppnik | |
| 4,254,169 A | 3/1981 | Schroeder ................... | 428/36.6 |
| 4,254,179 A | 3/1981 | Carson, III et al. | |
| 4,284,444 A | 8/1981 | Bernstein et al. | |
| 4,310,512 A | 1/1982 | Schleppnik | |
| 4,351,876 A | 9/1982 | Doi et al. | |
| 4,427,110 A | 1/1984 | Shaw, Jr. | |
| 4,612,221 A * | 9/1986 | Biel et al. .................... | 428/35.4 |
| 4,622,221 A | 11/1986 | Schleppnik | |
| 4,705,707 A | 11/1987 | Winter | |
| 4,716,061 A | 12/1987 | Winter | |
| 4,865,371 A | 9/1989 | Egberg | |
| 4,869,049 A * | 9/1989 | Richards et al. ................ | 53/459 |
| 4,898,633 A | 2/1990 | Doree et al. | |
| 4,909,986 A | 3/1990 | Koyayashi et al. | |
| 4,934,529 A | 6/1990 | Richards et al. | |
| 4,959,207 A | 9/1990 | Ueda et al. | |
| 4,989,727 A | 2/1991 | Gordon | |
| 5,022,553 A | 6/1991 | Pontius | |
| 5,039,243 A | 8/1991 | O'Brien | |
| 5,056,293 A | 10/1991 | Richards et al. | |
| 5,066,640 A * | 11/1991 | Voss et al. ....................... | 512/21 |
| 5,125,526 A | 6/1992 | Sumanis | |
| 5,128,199 A | 7/1992 | Iyer et al. | |
| 5,129,735 A | 7/1992 | Neal et al. | |
| 5,147,055 A | 9/1992 | Samson et al. | |
| 5,158,199 A | 10/1992 | Pontius | |
| 5,174,462 A | 12/1992 | Hames | |
| 5,310,787 A | 5/1994 | Katsuwa et al. | |
| 5,534,105 A | 7/1996 | Boyd | |
| 5,534,165 A | 7/1996 | Pilosof et al. | |
| 5,535,913 A | 7/1996 | Asbach et al. | |
| 5,590,512 A | 1/1997 | Richards et al. | |
| 5,640,931 A | 6/1997 | Markham | |
| 5,655,680 A | 8/1997 | Asbach et al. | |
| 5,659,933 A * | 8/1997 | McWilliams ..................... | 27/28 |
| 5,718,887 A | 2/1998 | Wolf et al. | |
| 5,813,200 A | 9/1998 | Jacoby et al. | |
| 5,860,959 A | 1/1999 | Gent | |
| 6,128,890 A | 10/2000 | Firth | |
| 6,129,715 A | 10/2000 | Cunningham | |
| 6,129,716 A * | 10/2000 | Steer ............................ | 604/333 |
| 6,150,004 A | 11/2000 | Oikawa et al. | |
| 6,170,240 B1 | 1/2001 | Jacoby et al. | |

(Continued)

FOREIGN PATENT DOCUMENTS

| | | |
|---|---|---|
| CA | 2019173 | 12/1990 |
| CA | 1298191 | 3/1992 |
| CA | 1318234 | 5/1993 |
| WO | 9817536 | 4/1998 |
| WO | WO 98/17536 A1 | 4/1998 |
| WO | WO02/051788 | 7/2002 |

OTHER PUBLICATIONS

International Search Report from corresponding PCT Application No. PCT/US03/11979 dated Mar. 22, 2004.
European Search Report form corresponding European Application No. 03726339.9-1261 dated Apr. 8, 2010.
International Search Report Dated Aug. 5, 2003 From Corresponding PCT Application No. PCT/US03/11977.
Written Opinion Dated Apr. 15, 2004 From Corresponding PCT Application No. PCT/US03/11977.
International Preliminary Examination Report Dated Oct. 7, 2004 From Corresponding PCT Application No. PCT/US03/11977.
Examiner's First Report Dated Oct. 23, 2006 From Corresponding Australian Application No. 2003228579.
Examiner's Second Report Dated Nov. 1, 2006 From Corresponding Australian Application No. 2003228579.
Examiner's Third Report Dated Jul. 4, 2007 From Corresponding Australian Application No. 2003228579.
Examiner's First Report Dated Jan. 6, 2009 From Corresponding Australian Application No. 2007216844.

(Continued)

Primary Examiner — Leszek Kiliman
(74) Attorney, Agent, or Firm — Ohlandt, Greeley, Ruggiero & Perle, L.L.P.

(57) ABSTRACT

A malodor transmission-resistant plastic finding employment in cassettes housing flexible tubular material.

3 Claims, 5 Drawing Sheets

U.S. PATENT DOCUMENTS

| | | | |
|---|---|---|---|
| 6,202,877 B1 | 3/2001 | La Torre et al. | |
| 6,258,423 B1 * | 7/2001 | Giori | 428/36.7 |
| 6,370,847 B1 | 4/2002 | Jenson et al. | |
| 6,516,588 B2 | 2/2003 | Jenson et al. | |
| 6,610,648 B2 | 8/2003 | McGee et al. | |
| 6,612,099 B2 | 9/2003 | Stravitz | |
| 7,100,767 B2 * | 9/2006 | Chomik et al. | 206/409 |
| 2002/0162304 A1 | 11/2002 | Stravitz | |

OTHER PUBLICATIONS

Office Action Dated Dec. 22, 2009 From Corresponding Canadian Application No. 2,482,587.
Office Action Dated Nov. 1, 2007 From Corresponding Mexican Application No. PA/a/2004/010115.
Office Action Dated Jan. 31, 2008 From Corresponding Mexican Application No. PA/a/2004/010115.

* cited by examiner

ODOR TRANSMISSION-RESISTANT POLYMERIC FILM

CROSS REFERENCE TO RELATED APPLICATIONS

This application is a division of U.S. patent application Ser. No. 10/418,895, filed Apr. 17, 2003 now U.S. Pat. No. 7,100,767, which claims the benefit of the filing date of U.S. Provisional Patent Application No. 60/373,143, filed Apr. 17, 2002. The entire content of each of the above applications is hereby expressly incorporated by reference.

BACKGROUND OF THE INVENTION

1. Field of the Invention

The present invention relates to plastic formulated to house malodorous waste in a manner to such that the plastic is resistant to the transmission of malodors from the waste to the ambient air.

2. Description of the Related Art

Many waste products produce smells generally found to be unpleasant to the olfactory sense ("malodor"). Malodors are frequently comprised of amines, thiols, sulfides, short chain aliphatic and olefinic acids, aldehydes and esters. For example, indole, skatole, and methanethiol are found in toilet odors, perpidine and morpholine in urine, and pyridine and triethyl amine in garbage odors, such as fish.

Numerous approaches have been proposed to reduce the perception of malodors from waste. These approaches generally affect one of two components of the typical waste receptacle, that is either alterations to the bag in which the waste is stored, or alterations to the receptacle in which the waste is stored.

In regard to receptacles many types of receptacles have been proposed to reduce the perception of malodor coming from the waste disposed therein. These receptacles typically employ one of several approaches to reduce the emanation of malodor from the receptacle, which may be characterized as the use of making agents, odor sorbent material, inner lids or seals, air locks or sealed packaging.

Receptacles that employ masking typically have a scent added to them in the hope of hiding the smell of the malodor by producing a smell that is preferentially recognized by the olfactory senses. Receptacles that employ odor sorbents, that is chemicals that either adsorb, absorb, intercolate in a molecular cage, or otherwise associate with malodors, attempt to remove malodors from the ambient air surrounding the waste. An example of such approach is set forth in U.S. Pat. No. 5,174,462 to Hames which uses an activated charcoal adsorber mounted in a perforated holder beneath the container lid to adsorb malodors while the lid is closed. U.S. Pat. No. 2,411,430 to Hodson shows a diaper container including an odor absorbing material attached to a lid portion of the container. In U.S. Pat. Nos. 5,022,553 and 5,128,199 to Pontius, there is disclosed a diaper container for temporarily storing soiled diapers prior to final disposal that employs a liner comprising a pad of non-woven synthetic fibers impregnated with an odor absorbing material, such as activated carbon.

Receptacles employing inner lids or seals typically position the inner lid or seal between the conventional container pail and an outer lid in order to reduce leakage of odors when the outer lid is closed and/or to minimize the time during which the user is exposed to malodors accumulated in the pail while adding more waste. For example, U.S. Pat. No. 4,427,110 to Shaw Jr. includes a canister and seal insert having a plurality of slits intersecting centrically to provide flexible, sliced pie-shaped sectors adapted to be flexed downward into the canister base. The top has a handle with a deodorizer and has a frusto-conical plunger adapted to flex the sectors of insert downward so as to permit a soiled diaper to be deposited through the sectors into the canister. The air lock approach includes a lid that covers a first chamber, a transfer mechanism, and a second chamber for finally receiving the waste. After depositing waste into the first chamber, the user closes the lid and then actuates a transfer mechanism to transfer the waste material from the first chamber to the second chamber. For example, U.S. Pat. Nos. 5,535,913 and 5,655,680 to Asbach et al. describe a diaper pail with a constrictor located under the lid. Operation of the pail involves opening the lid, depositing the waste into the holding chamber, and closing the lid. The constrictor is then opened allowing the waste to fall from the holding chamber into the storage chamber. Finally, the constrictor is closed to prepare the pail for the next deposit of waste. Therefore, malodors from the second chamber are never directly exposed to the outside environment. Other examples of this approach are disclosed in U.S. Pat. No. 1,226,634 to Briese, U.S. Pat. No. 1,239,427 to Bunnel & Gates, and U.S. Pat. No. 1,265,148 to Warren.

The sealed packaging approach requires a mechanism for sealing a waste in a liner bag attached to the disposal receptacle. An example of such device is the Turn 'N Seal Diaper Pail sold by Safety 1.sup.st (which also incorporates an inner lid). The pail has a mechanism for twisting closed the neck of a plastic liner bag used to hold the soiled diapers. U.S. Pat. No. 5,125,526 to Sumanis discloses a garbage pail in which the bag is secured to a rotatably mounted holder inside the pail, the top of the bag is fastened in place so that rotation of the holder opens and closes the neck of the bag by twisting it. Quantum waste individual sealed packaging may also be employed, as for example shown in U.S. Pat. Nos. 4,869,049 and 5,590,512 to Richards et al., U.S. Pat. Nos. 5,813,200 and 6,170,240 to Jacoby et al., U.S. Pat. No. 6,128,890 to Firth, U.S. patent application Ser. No. 10/138,058 (Pub. No. US2002/0162304A1, published Nov. 7, 2002) in which a container has an inner storage chamber accessed via a closable lid and an intermediate tubular core. In Richards' individual packaging receptacle embodiment a replaceable cassette houses flexible tubing surrounding a core. U.S. Pat. Nos. 6,370,847 and 6,516,588 to Jensen et al. disclose a quantum waste sealing system employing heat-sealing members moved between an open position and a closed/sealed position by either twisting an inner lid, closing the lid, or moving an activation arm. The sealing member thermally-fuse the tubing to form a sealed package containing the diaper.

While not limited thereby, an example of a representative cassette useful in quantum waste sealing devices is shown in U.S. Pat. No. 4,934,529 to Richards et al. As would be understood by one of ordinary skill in the art, other cassette constructs, such as shown in U.S. Pat. No. 3,356,192 to Couper, may be employed. The flexible tubing is dispensed from the cassette. The length of flexible tubing is stored along side the core with a closed end disposed at the lower end of the core. After a diaper or other waste is deposited into the tube, the core is rotated, which twists the flexible tube to create a seal above the diaper/waste. To dispose the next diaper or quantum of waste the user opens the lid and inserts the same. The previous seal is pushed downward, and a new seal is formed by twisting the tube above the newly deposited waste. Thus the device stores the waste in a series of individually wrapped packages in the storage chamber, each package being separated from adjacent packages by, for example, twists in the tube.

Other techniques that have been employed in receptacles are also known such as the inhibition of the formation of the malodor itself, by for example exposing the otherwise odorous material to antimicrobials and enzyme inhibitors.

Numerous compounds, which range from non-descript plant extracts to single and multiple chemical entities, have been touted to reduce the sensory perception of malodors. For example, U.S. Pat. No. 3,077,457 to Kulka discloses fumaric acid esters as malodor counteractants, while U.S. Pat. No. 4,187,251 to Kulka discloses esters of alpha-, beta-unsaturated monocarboxylic acids as malodor counteractants. U.S. Pat. No. 3,923,005 to Fry et al. discloses the use of chlorophyll to remove the smell from used cat litter, while U.S. Pat. No. 4,989,727 discloses a malodor counteractant consisting of deodorizing ingredients extracted from plants and is said to be useful for a wide variety of smells, including sulfur and nitrogen compound odors. Other compounds disclosed to be useful as malodor counteractants include water-soluble organic polymers having an average molecular weight of at least 100,000 (U.S. Pat. No. 4,909,986 to Kobayashi et al.), a mixture of an acid anhydride with a copper compound (U.S. Pat. No. 4,959,207 to Calhoun), a,.OMEGA.-alkanedicarboxylic acids and moncarboxylic acid esters of oligoglycerols (U.S. Pat. No. 5,718,887 to Wolf et al.—useful in reducing body odor), beta-cyclodextrin (U.S. Pat. No. 5,534,165 to Pilosof et al.), and undecylenic acid and its derivatives. U.S. Pat. Nos. 4,009,253, 4,187,51, 4,310,512, and 2,221 to Schleppnik disclose the use of 4-cyclohexyl-4-methyl-2-pentanone, alkyl cyclohexyl alkyl ketones, acetic and propionic acids, and cyclohexyl alkyl ketones, respectively, as malodor counteractants. WO 02/051788A1 (PCT/CH01/0076) discloses certain aromatic unsaturated carboxylic esters wherein the unsaturation is conjugated to both the aromatic ring and the carbonyl group portion of the carboxylic ester to be useful in the a malodor counteractants.

As today most waste products retained in waste receptacles are housed in closed bags, another major manner of reducing malodor perception has been to fabricate bags that protect against the release of odors.

Scented plastic waste bags are known in the art. Such bags include fragrance which is either added into or placed on the surface of the bag. The bags are designed to mask odors produced by the waste contained therein releasing the scent in the same container wherein the malodor may build up.

It is also known to use malodor counteractant material in bags to prevent the perception of malodor from the bag. For example, U.S. Pat. No. 6,129,716 discloses an ostomy bag which carries or contains malodor counteractant material to counter the odor produced by the waste held within the bag. As disclosed in U.S. Pat. No. 6,129,715 such malodor counteractant material may be in microencapsulated form. See, also U.S. Pat. No. 5,860,959 to Gent. U.S. Pat. Nos. 4,284,444 and 6,150,004 both disclose applying antibacterial materials to polymeric materials. Many malodor counteractants can not be incorporated into particular polymers during molding because of physical compatibility problems, because they are degraded in the molding or mixing process, and/or because the integrity of the plastic's structure itself may be compromised by the incorporation of any particular counteractant into the plastic. Therefore, the formulation of plastics with malodor counteractants is quite difficult.

Another technique employed to reduce smell from plastic waste bags is to formulate the plastic comprising the bag in a manner such that it becomes impermeable to malodorous gas. One of the most common, and effective, barrier materials known to prevent the transfer of malodorous gas is polyvinylidene chloride (PVDC) which is commonly used in ostomy bags but which has been proposed for packaging film as well. See, U.S. Pat. No. 3,579,416 to Schrenk. The use of PVDC in general waste disposal bags, however, has not been adopted due to numerous problems associated with the plastic. First, PVDC is expensive and a difficult material to handle. Second there are growing safety and environmental concerns regarding the safe disposal of PVDC, particularly by incineration. Further, its highly crystalline structure makes the material crackle and rustle when it moves, or is bent, properties that may not be ideal to consumers.

Other plastics, plastic co-extrusions and plastic laminates have been proposed as possessing the ability to effectively reduce the transfer of malodorous gas from the waste into the ambient air. For example, U.S. Pat. No. 5,129,735 discloses a bag having an inner slippery polyethylene layer and a co-extruded outer carbon containing polyethylene layer for use in trash compactors which is said to reduce the perception of odor from the bag. U.S. Pat. No. 4,612,221 to Biel et al. discloses a multilayer film comprising two outer layers of a polyolefin resin, such as polypropylene containing a cling agent, and a core layer of a polyamide, such as Nylon, which it asserts has low permeability to food odor. U.S. Pat. No. 6,258,423 teaches an odor barrier multilayer film for use in ostomy bags comprising two layers of a homopolymer of ethylene or a copolymer of ethylene and an alpha-olefin, or an ester-containing monomer, flanking a core of polyester resin. U.S. Pat. No. 4,351,876 to Doi et al. teaches a laminate film of cross linked polyethylene resin that has an outer layer comprising a copolymer of ethylne and an ethylenically unsaturated silane compound that has a gel content of five percent or more, which it states possess excellent odor inhibiting properties. The barrier to gases is also said to be substantial in the multi-layer film disclosed in U.S. Pat. No. 4,254,169, which discloses a multi-layer film comprising a core layer of vinyl alcohol polymers or copolymers, such as polyvinyl alcohol or ethylene vinyl alcohol adhered to one or more layers of a polyolefin blended with a chemically modified polyolefin having functional groups added to the basic polymer to permit strong adhesion to the core layer. In the ultimate of smell control, U.S. Pat. No. 5,659,933 teaches a sealable multilayer laminate for use of storing bodily remains comprising at least two layers of a polymeric sheet material comprising either polyolefin, nylon or polyvinyl materials with a metal foil layer between them.

As would be understood by one of ordinary skill in the art, many other multi-layer barrier films have also been proposed as packaging materials for various other purposes (See, e.g., U.S. Pat. No. 4,101,711 which discloses a packaging laminate comprising an outer layer of a polyamide, such as nylon, and an intermediate non-woven web of spun-bounded polyester, polypropylene or polyethylene for use in packaging cuts of meat containing sharp-edged bones; U.S. Pat. No. 3,741,253 to Brax et al. discloses a laminate film having a first layer of cross linked ethylene vinyl acetate polymer, a directly joined middle layer of a polymer of vinylidene chloride and a third layer directly joined to the middle layer of ethylene/vinyl acetate polymer for use in packaging meats; U.S. Pat. No. 4,716,061 to Winter which discloses a packing film for use inside a microwave popcorn bag comprising a base layer of polypropylene homopolymer, polypropylene copolymer or combinations thereof, a heat sealant layer of polyester/copolyester or blends thereof and a tie layer of modified polyethylne homopolymer, modified polyethylene copolymer, modified polypropylene homopolymer, an unmodified polypropylene copolymer or combinations thereof; and U.S. Pat. No. 4,705,707 to Winter comprises a base layer of polyethylene, preferably high density, a heat sealant layer of polyester/copolyester or blends thereof and a tie layer of modified polyethylene homopolymer, modified polyethylene copolymer, unmodified polyethylene copolymer or combinations thereof between the base layer and the heat sealant layer).

A particularly difficult trash to retain for ultimate disposal is diapers. Diapers are typically stored and accumulated in a container. The cumulative odor of diapers being stored within the container frequently reaches such an offensive level that the diapers must be disposed of before the container is full. The latter leads to a large use of container liners such as bags, and excessive emptying operations.

One particularly useful approach in diaper disposal has been the waste quantum sealed packaging approach which uses a mechanism for sealing the diaper waste in a flexible tubular liner which is continuously fed from a cassette wherein it is housed. An example of such device is the Diaper Genie® sold by Playtex Products®. Waste quantum sealed packaging may be employed, as for example shown in U.S. Pat. Nos. 4,869,049 and 5,590,512 to Richards et al., U.S. Pat. Nos. 5,813,200 and 6,170,240 to Jacoby et al., U.S. Pat. No. 6,128,890 to Firth, and U.S. patent application Ser. No. 10/138,058 (Pub. No. US2002/0162304A1, published Nov. 7, 2002) in which a container has an inner storage chamber accessed via a closable lid and an intermediate tubular core.

In the Richards' quantum sealed packaging unit embodiment a replaceable cassette houses flexible tubing surrounding a core. While not limited thereby, an example of a representative cassette is shown in U.S. Pat. No. 4,934,529 to Richards et al. As would be understood by one of ordinary skill in the art, other cassette constructs, such as shown in U.S. Pat. No. 3,356,192 to Couper, may be employed. The flexible tubing is dispensed from the cassette. The length of flexible tubing is stored along side the core with a closed end disposed at the lower end of the core. After a quantum of waste is deposited into the tube, the core is rotated, which twists the flexible tube to create a seal above the waste. To dispose the next quantum of waste the user opens the lid and inserts the waste. The previous seal is pushed downward, and a new seal is formed by twisting the tube above the newly deposited quantum of waste. Thus the device stores the waste in a series of individually wrapped packages in the storage chamber, each package being separated from adjacent packages by twists in the tube.

FIG. 1 illustrates a typical cassette embodiment of the prior art finding use in a quantum waste sealed packing unit. Cassette [40] houses flexible tubular plastic [44], which is stored between tubular core [46], casing wall [42] and cassette bottom [54]. Tubing [44] is dispensed through gap [50] to produce dispensed tubing [58] which exists the cassette [38] through opening [60]. Cassette [40] advantageously includes an annular cap [48] which acts as a retaining cover to help retain tubing [44]. Annular cap [48] may be joined to casing wall [42], as illustrated, but may also be attached to tubular core [46] or less advantageously to cassette bottom [54]. Annular cap [48] may be affixed to the cassette by, for example, detent means [56].

SUMMARY OF THE INVENTION

The present invention provides improved plastics for amelioration of malodor transmission. In particular, there is provided malodor-resistant plastics that may be advantageously used in quantum waste sealing packaging units employing tubular flexible plastic.

In one embodiment of the present invention there is disclosed a container holding a supply of plastic tubular stock for the incremental withdrawal of portions thereof, the plastic tubular stock comprising a malodor counteractant comprising an aromatic unsaturated carboxylic ester wherein the unsaturation is conjugated to both the aromatic ring and the carbonyl group portion of the carboxylic ester. The malodor counteractant may further comprises a compound selected from the group consisting of: a malodor adsorbing compound, a malodor absorbing compound, a masking agent, a cage compound. The malodor counteractant may also be microencapsulated.

In another embodiment of the invention, there is provide a cassette for use in dispensing flexible tubing packed therein in layered form, the cassette comprising a rigid body formed by a central tubular core open at top and bottom, a surrounding casing wall positioned to provide a space between said tubular core and the casing wall and a base wall joining a lower end of said surrounding casing wall to the lower end of the tubular core, a length of flexible tubing packed profusely in a tightly layered mass in the space to constitute a pack surrounding the tubular core, and a cap placed over a portion of said pack, said cassette comprises a malodor counteractant in the flexible tubing, wherein the malodor counteractant is an aromatic unsaturated carboxylic ester wherein the unsaturation is conjugated to both the aromatic ring and the carbonyl group portion of the carboxylic ester. The malodor counteractant may further be selected from the group consisting of: a malodor adsorbing compound, a malodor absorbing compound, a masking agent, a cage compound.

In yet another embodiment there is provide a malodor transmission resistant film comprising a laminate or co-extrusion of a polyamide layer sandwiched between two high density polyethylene layers. There is also provided a cassette for dispensing such flexible tubing, the cassette comprising a rigid body formed by a central tubular core open at top and bottom, a surrounding casing wall positioned to provide a space between said tubular core and said casing wall and a base wall joining a lower end of said surrounding casing wall to the lower end of said tubular core, the length of flexible tubing packed profusely in a tightly layered mass in said space to constitute a pack surrounding said tubular core, a cap placed over a portion of said pack. The flexible tubing should be positioned in the cassette such that any waste placed in the tubing is in proximal contact to the high density polyethylene layer and the nylon layer is distal to such waste.

In yet another embodiment of the present invention, there is disclosed a cassette for use in dispensing flexible tubing packed therein in layered form, the cassette comprising a rigid body formed by a central tubular core open at top and bottom, a surrounding casing wall positioned to provide a space between said tubular core and said casing wall and a base wall joining a lower end of said surrounding casing wall to the lower end of said tubular core, a length of flexible tubing packed profusely in a tightly layered mass in said space to constitute a pack surrounding said tubular core, a cap placed over a portion of said pack, wherein said flexible tubing comprises a blown polyester.

BRIEF DESCRIPTION OF THE DRAWINGS

A more complete appreciation of the invention and advantages thereof will be more readily apparent by reference to the detailed description of the preferred embodiments when considered in connection with the accompanying figures, wherein.

DETAILED DESCRIPTION OF THE INVENTION

Figure 1:
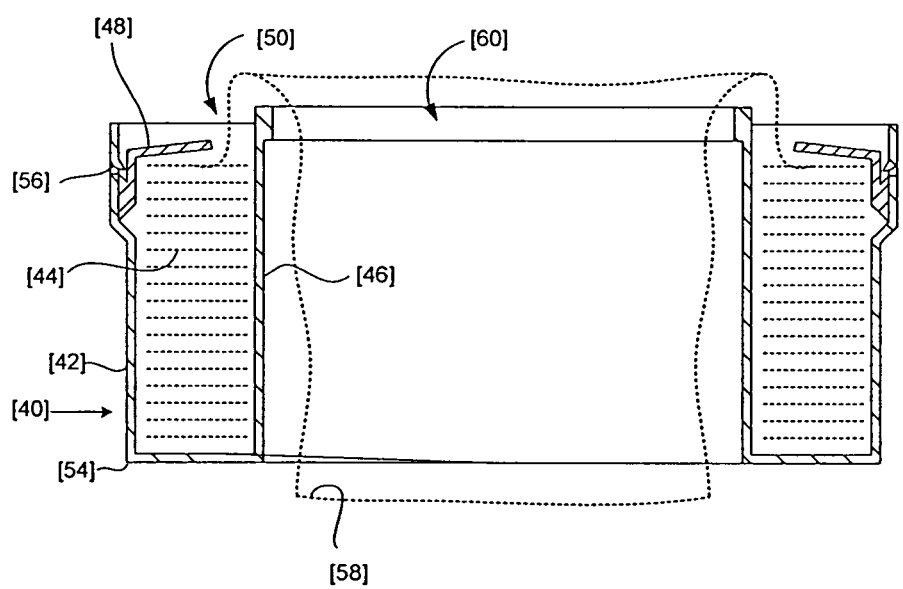
FIG. 1 is a prior art cassette embodiment finding use in a quantum waste sealed packaging device.

The present inventors have recognized that malodor transmission given off by a soiled diaper, cat litter clump, fecal matter or food trash, for example, is a combination of water vapor moisture transmission and malodor transmission. Individual materials are available that can minimize either moisture transmission or an organic malodor transmission. However, a single material has not yet been identified that can adequately retard the transmission of both moisture and malodor in combination with the mechanical properties needed to convert the film into cassettes without splitting or tearing.

The present inventors have discovered a multilayer film that may be composed of various materials bonded together in either the blown film or cast film processes, or laminated together. The polymeric "laminate" or "co-extrusion" can be used to seal in odors for long periods of time. The laminate or co-extrusion is based on the discovery that while certain plastics are good at protecting against the passage of odors, odors will over time pass through the plastic due to the passage of moisture through the plastic. For example, nylon films have been found to be particularly useful in preventing the passage of malodors as, for example, associated with feces at a standard temperature and pressure. However, the same films permit the passage of water vapor that in an air-trapped container accentuate the small amount of odor that passes through the material. For example, baby-diaper disposal systems typically employ sealed containers enclosing the plastic bag into which the diapers are enclosed. The enclosed nature of the container permits a build up of humidity in the container.

The number of layers that may be employed in the present invention preferably range from two to seven layers. Each layer can be a distinct material with barrier properties, or a binding layer used to keep dissimilar materials together.

The multi-layer films of the present invention may be used in a device that is used to dispose unwanted malodorous articles, such as, but not limited to, diaper pails, litter disposal containers and kitchen trash containers. The film may be wrapped around the malodor source and sealed in order to reduce bacterial and malodor transmission.

The laminate or co-extrusion embodiment of the present invention comprises a moisture-resistant polymeric material, such as a high density polyethylene layer, and an odor barrier polymeric layer, such as a nylon layer. A preferred laminate or co-extrusion comprises a moisture-resistant polymeric material on the side to be exposed to the waste and an odor barrier polymeric layer adjacent thereto. A preferred laminate or co-extrusion embodiment comprises an odor barrier polymeric barrier flanked on each side by a moisture-resistant polymeric material. A preferred embodiment comprises a polyamide layer, e.g., nylon, sandwiched between two high density polyethylene layers. Surprisingly the inventors have discovered that a laminate having the layer comprising the moisture barrier (e.g., the high density polyethylene layer) proximal to the odiferous material provides far greater protection against odor detection than when the odor resistant layer (e.g., the nylon, EVOH, or polyester layer) is proximal to the odiferous material. That is, odor reduction is significantly enhanced when the odiferous material is in contact with the pure moisture barrier which in turn is in contact with the odor barrier.

In a sandwiched laminate or co-extrusion, the third layer may comprise instead of a pure moisture barrier, such as high density polyethylene, a polymeric material containing a fragrance or odor-absorbing material. In one preferred embodiment the multi-layer film comprises HDPE film from Equistar and Nylon materials from BASF. The film gages preferably range form 0.5 to 1.5 mils. Such films may be incorporated into other systems designed to reduce smell from otherwise "smelly items."

Figure 2:
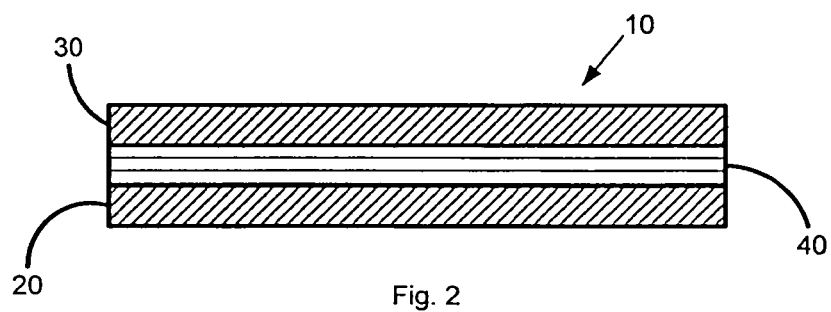
FIG. 2 is a cross-section of a multilayer film of the present invention which guards against the transmission of odors.

FIG. 2 demonstrates a film 10 embodiment useful for reducing malodor transmission. Film 10 comprises upper high density polyethylene layer 30, low high density polyethylene layer 20, and middle polyamide layer 40 positioned between upper high density polyethylene layer 30 and lower high density polyethylene layer [20].

Such laminate or co-extrusion can be advantageously used in a cassette for use in a waste quantum sealed packaging unit, such as the Diaper Genie. Such devices for functionality require that the plastic possess certain properties, high among these is strength under load, easy compactability in the cassette, and adequate slip to allow easy dispensing from the cassette.

It has also been discovered that when certain malodor counteractants are incorporated into or on the tubular flexible plastic stored in the cassette itself that packages formed using the tubular flexible plastic in many cases provide unexpectedly good malodor reduction capacity when compared to packages comprising the same tubular flexible plastic which is not dispensed from the cassette. The latter may be due to the fact that the malodor counteractants are not exposed to the ambient environment as long as their non-housed counterparts, thus they are not exposed as long to components of the ambient environment (such as moisture) which may diminish the activity of the malodor counteractant. Furthermore, the latter may be due to fact that enclosure of the counteractant-treated tubular flexible plastic in a relatively sealed environment reduces the rate at which volatile malodor counteractants volatilize into the atmosphere.

While the laminate/co-extrusion embodiment has been found to produce un-anticipated good protection against the transmission of malodors, the present inventors have also found that pure blown polyester provides significantly more protection against odor transmission than high density polyethylene which is conventionally used in such cassettes.

Figure 3:
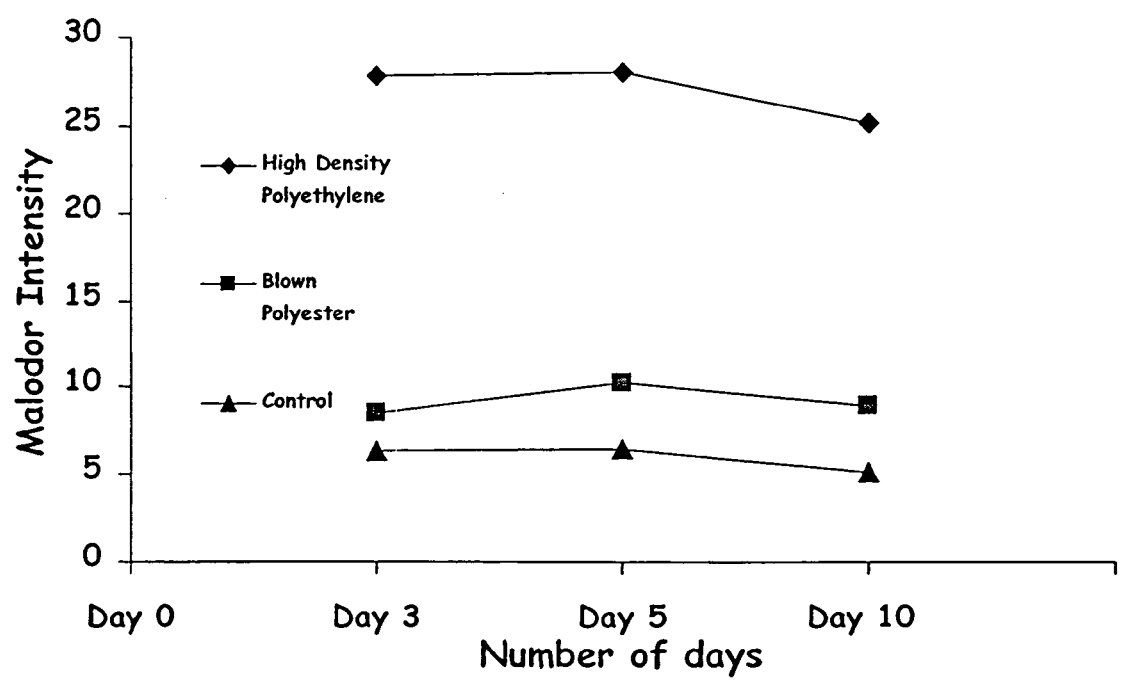
FIG. 3 is a graph showing the effectiveness of blown polyester film as compared to high density polyethylene film in preventing the transmission of fecal malodor.
Figure 4:
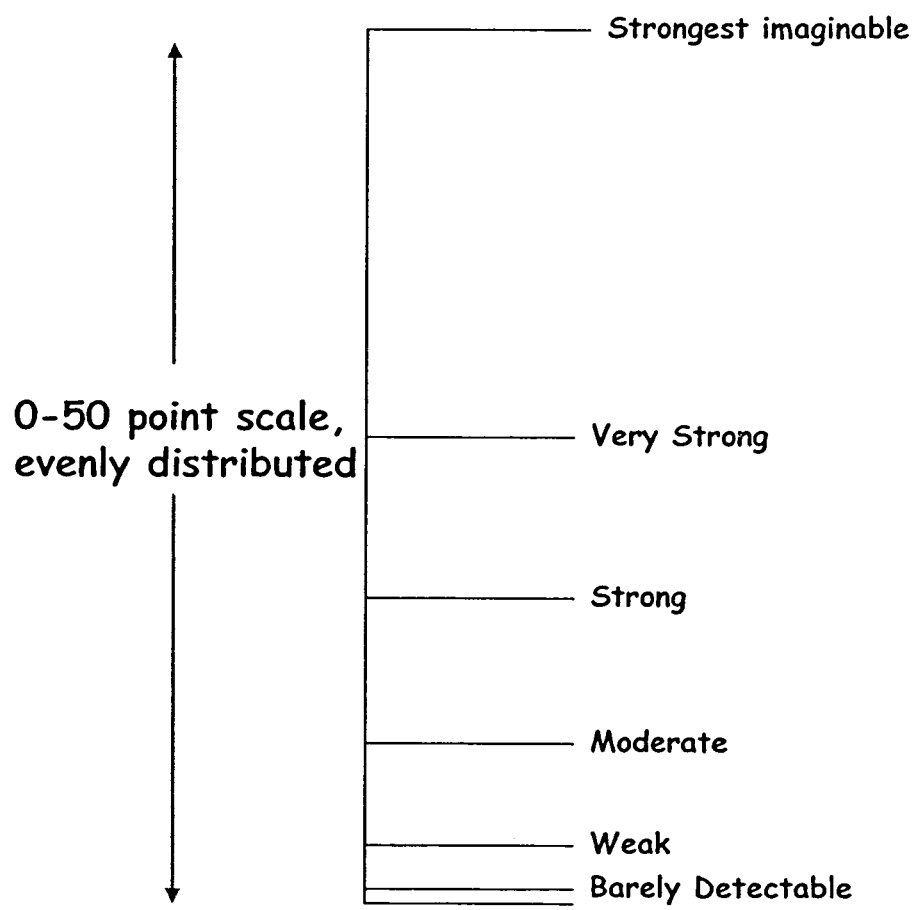
FIG. 4 is a labeled magnitude scale used by a panel to determine the magnitude of transmission of malodors across a test plastic.

Referring to FIG. 3, in a trained objective sensory panel test (10 persons) determined to be able to discern the difference between five concentrations of synthetic fecal malodor over a ten day period, using a labeled magnitude scale shown in FIG. 4, it has been determined that polyester films (.box-solid.) significantly outperforms high density polyethylene films (.diamond-solid.) which are conventionally used in cassettes in quantum waste sealed packaging devices.

As blown polyester film is currently much more expensive than high density polyethylene film, the present inventors undertook to determine whether the transmission of malodors across high density polyethylene film could be reduced by incorporation of a malodor counteractant into the film.

Figure 5:
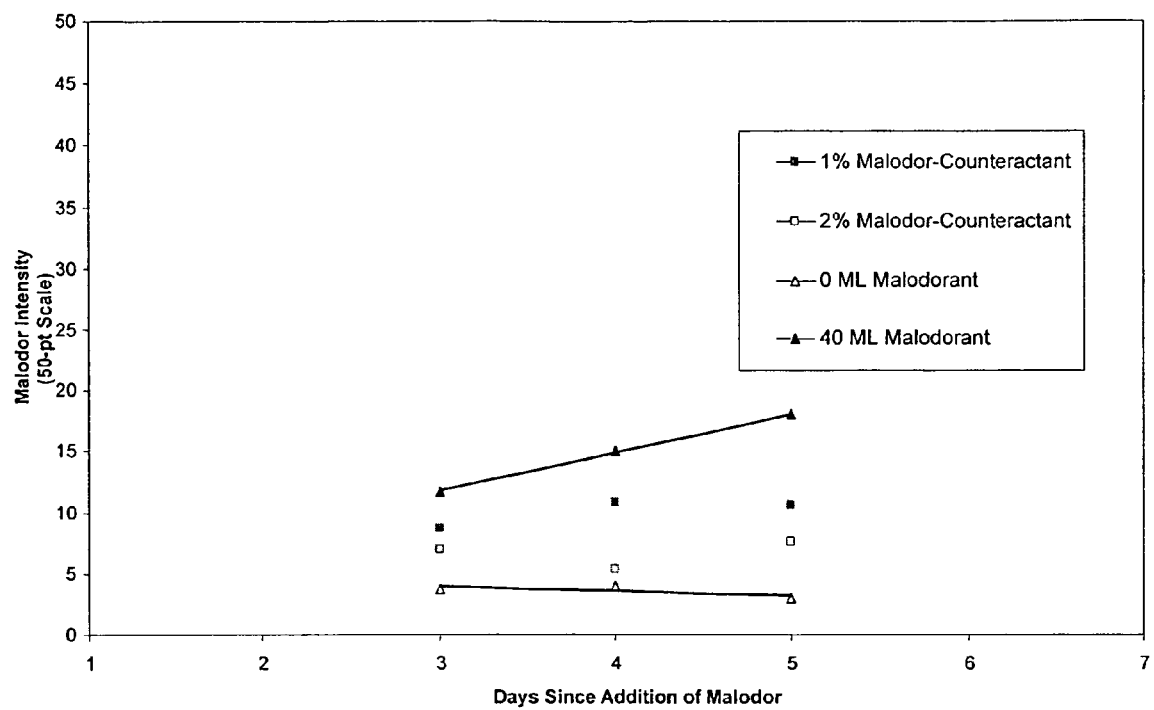
FIG. 5 is a graph showing the effectiveness of high density polyethylene film containing an aromatic unsaturated carboxylic ester having unsaturation conjugated to both the aromatic ring and the carbonyl group portion of the carboxylic ester as disclosed in WO 02/051788 A1.

FIG. 5 is a graph showing the effectiveness of high density polyethylene film containing an aromatic unsaturated carboxylic ester having unsaturation conjugated to both the aromatic ring and the carbonyl group portion of the carboxylic ester as disclosed in WO 02/051788 A1. After many attempts, the present inventors have discovered, as illustrated in FIG. 5, that high density polyethylene film (0.12 mil plastic thickness for toddler, 0.8 mil plastic thickness for infant) could be used to reduce the transmission of malodors to a significant degree by the incorporation of a compound of the type described in WO 02/051788 A1. The malodor-counteractant of FIG. 2 is Neutraq A (UJ011955/00) (Givaudan, Teaneck, N.J.). A trained objective sensory panel (10 persons) found 0.12 mil high density polyethylene film comprising Neutraq A 1% (.box-solid.) and 2% (.quadrature.) significantly reduced malodor transmission (synthetic fecal smell) across the plastic.

Throughout this specification, the word "comprise" or variations such as "comprises" or "comprising" will be understood to imply the inclusion of a stated integer or group of integers but not the exclusion of any other integer or group of integers.

Statement Regarding Preferred Embodiments

While the invention has been described with respect to preferred embodiments, those skilled in the art will readily appreciate that various changes and/or modifications can be made to the invention without departing from the spirit or scope of the invention as defined by the appended claims. All documents cited herein are incorporated in their entirety herein.

The invention claimed is:

1. A film for containing odiferous material, consisting of:
a moisture-resistant polymeric layer, said moisture-resistant polymeric layer consisting of high density polyethylene and a compound having the following formula,

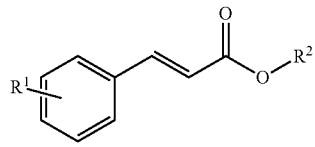

wherein $R^1$ is an hydrogen, an alkyl, an alkoxy, a substituted or unsubstituted aryl, and $R^2$ is an alkyl having more than 6 carbon atoms, an aryl, or a substituted aryl;
an odor-barrier polymeric layer consisting of polyamide; and
optionally, a binding layer between said moisture-resistant polymeric layer and said odor-barrier polymeric layer.

2. The film of claim 1, wherein the moisture-resistant polymeric layer has a thickness of approximately 0.5 mil to 1.5 mil.

3. The film of claim 1, wherein the odor-barrier polymeric layer has a thickness of approximately 0.5 mil to 1.5 mil.

* * * * *